United States Patent [19]

Washbourne et al.

[11] 4,150,849
[45] Apr. 24, 1979

[54] APPLICATOR

[75] Inventors: Colin Washbourne, Stourbridge; Bryan W. Edwards, Sutton Coldfield, both of England

[73] Assignee: Foseco International Limited, England

[21] Appl. No.: 827,280

[22] Filed: Aug. 24, 1977

[30] Foreign Application Priority Data

Aug. 17, 1976 [GB] United Kingdom ............... 34101/76

[51] Int. Cl.$^2$ ............................................... B25J 1/00
[52] U.S. Cl. ................................................... 294/19 R
[58] Field of Search ............. 294/15, 17, 19 R, 19 A, 294/22, 27 R, 53.5; 214/1 S, 1 SW; 224/45 R, 45 P, 45 T

[56] References Cited

U.S. PATENT DOCUMENTS

| 807,268 | 12/1905 | Higbee | 294/19 R X |
| 2,428,941 | 10/1947 | Packard | 294/15 X |
| 3,600,029 | 8/1971 | Nagel | 294/19 A |
| 3,737,187 | 6/1973 | Pryor | 294/19 R |

FOREIGN PATENT DOCUMENTS 1354500 5/1974 United Kingdom ..................... 294/15

Primary Examiner—Johnny D. Cherry
Attorney, Agent, or Firm—Caesar, Rivise, Bernstein & Cohen, Ltd.

[57] ABSTRACT

An applicator, for holding an object such as a slab or tile, having a coating of adhesive on one face and applying the object to a vertical surface, comprises a tray mounted on one end of a shaft which has a handle at the other end. The tray is pivoted to the shaft about an axis transverse to the shaft, and is spring-loaded to a tilted position in which the tray faces partly towards the handle end of the shaft. Along the edge of the tray remote from the handle is a lip to retain the object on the tray. The applicator is held with the tray end downwards. The object rests on the lip, adhesive side outwards, and leans back against the tray while being carried to the surface to which it is to be applied. At the surface the bottom edge of the slab can be positioned accurately and then pressure applied through the shaft to the tray so that the tray is tilted against the spring force to bring the adhesive-coating into full contact with the surface. The handle can be oblique to the other end of the shaft and the pivot for the tray mounted on a sleeve rotatable about the shaft so that the tray can be moved between two positions, one facing towards the oblique handle and the other facing away.

10 Claims, 3 Drawing Figures

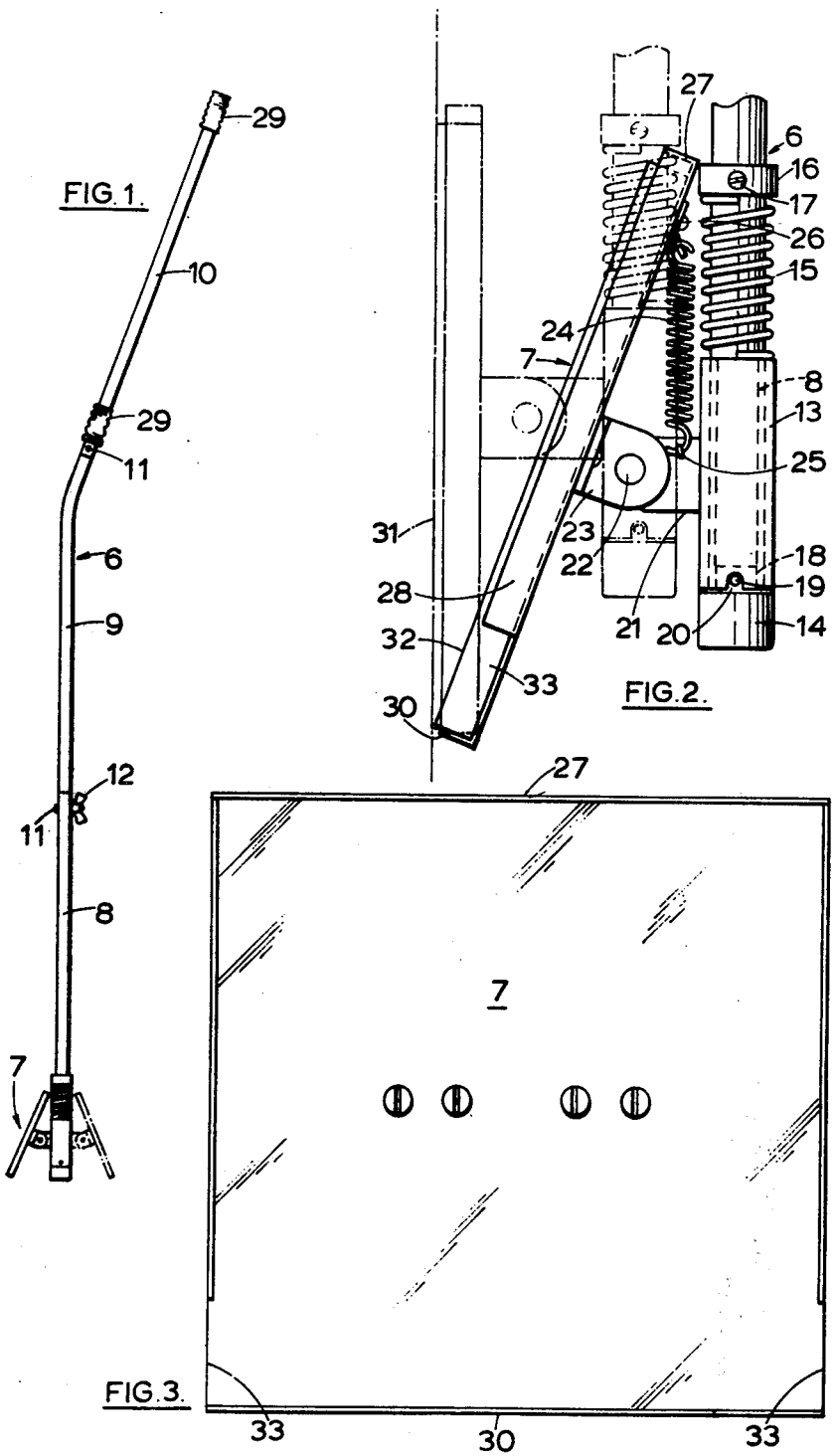

APPLICATOR

This invention relates to an applicator for holding an object having a coating of adhesive and applying the object to a substantially vertical surface.

An example of the use of the applicator is in affixing indicia to an ingot mould wall so that cast ingots will have identification markings, but the invention may be used for applying other objects in different circumstances. Such an applicator is hereinafter referred to as of the kind described.

The applicator should be able to:
(i) hold an object securely prior to fixing.
(ii) release the object completely once the object is fixed, so that the adhesive layer is not damaged by tugging.
(iii) catch the object if the adhesive bond is unsatisfactory, for example, due to dust on the substrate.

Sometimes objects must be applied to a surface in a rather inaccessible position remote from the operator or inconvenient for him to reach. It is an aim of the present invention to provide an applicator which enables an object to be affixed to a substantially vertical surface below the level at which the operator is standing. An example of a use in which this need arises is in affixing the indicia previously mentioned to the inside walls of ingot moulds below floor level or below the level of a deck alongside a mould or of a bridge across it.

The present invention consists in an applicator for holding an object having a coating of adhesive and applying the object to a substantially vertical surface comprising a shaft forming a handle at one end and carrying at or near the other end a tray pivoted to the shaft about an axis transverse to the shaft, the open side of the tray facing away from the shaft and having at least along the edge remote from the handle end of the shaft a lip for retaining the object of the tray, the tray being spring urged towards one extreme of its pivotal movement into a tilted position in which the open side of the tray faces partly towards the handle end of the shaft.

In use of the applicator an object to be affixed is laid on the tray, adhesive side outwards. The operator holds the applicator by the handle end of the shaft with the tray end downwards. The object is prevented from slipping off the tray by the retaining lip and because of the tilted attitude of the tray the object leans against it while being moved. The object is taken on the applicator to the surface to which it is to be affixed, the adhesive side facing the surface. The lower edge of the object that lies against the retaining lip is positioned correctly by the operator in relation to the surface and then, by manipulating the handle end of the applicator to urge the tray towards the surface, the operator causes the tray to tilt, against the action of the spring, and bring the adhesive side of the object fully into contact with the surface. The operator applies sufficient pressure and maintains it for long enough to allow the adhesive to grip the surface and affix the object properly to the surface. When the operator reduces his pressure, the spring tilts the upper part of the tray away from the surface but keeps the retaining lip close to it. If the adhesive does not grip the surface the retaining lip catches the lower edge of the object which falls back into the tray and can be taken away to a place where it can be attended to conveniently.

The pivotal axis is preferably so arranged to one side of the shaft that in the tilted position the spring urges the edge of the tray that is nearer the handle end of the shaft against the shaft. The shaft may extend straight from the tray end but, to enable the operator to exert enough pressure on the tray end, the shaft near the handle end is preferably bent so that the handle end lies oblique to the remainder and the handle end is provided with well spaced hand grips. When the handle is bent in this way the tray and its pivot are preferably swivelly mounted around the shaft and means provided for locating the tray in each of two positions, one facing away from the direction in which the handle is bent and the other towards that direction, for use in applying objects to surfaces facing respectively towards and away from the operator.

The features described in the previous paragraph provide an applicator which is adaptable for use in a variety of circumstances and in this form is very suitable for field trial work, for example in different steelworks. The needs of a particular steelworks might be met by a simpler arrangement.

One form of applicator according to the invention and intended for use in affixing indicia to the walls of ingot moulds is illustrated in the accompanying drawings in which, FIG. 1 is a side elevation of the applicator, FIG. 2 is an enlarged view of the lower part of FIG. 1, and FIG. 3 is a front elevation of a tray part of the applicator of FIGS. 1 and 2.

The applicator, which is a comprehensive model intended for field trail work, comprises a shaft 6 and tray 7. The shaft, for convenience in carriage between trials, is built up from three tubular sections joined end-to-end, a lower section 8, an intermediate section 9 and a handle section 10. Between adjacent sections are joints formed by a spigot rigid with one section and retained in the bore of the adjacent section by a diametral bolt 11 fitted with a wing nut 12. The lower section 8 is straight and near its lower end is surrounded by a sleeve 13 (FIG. 2) retained on the section 8 by an end cap 14. One end of a compression spring 15 bears on the end of the sleeve remote from the end cap; the other end of the spring 15 abuts a collar 16 which is movable along the section 8 to adjust the spring force and can be locked in an adjusted position by a locking screw 17. The end cap 14 has a spigot 18 which enters the bore of the section 8. A cross-pin 19 passes through the section 8 and the spigot 18 to retain the end cap. The ends of the cross-pin 19 project beyond the surface of the tube forming the section 8 to engage recesses 20 in the lower end of the sleeve. The cross-pin 19 and recesses 20 constitute axially engageable cooperating locating formations on the shaft and sleeve urged axially into engagement by the spring 15.

Welded to the sleeve is a lub 21 projecting laterally of the section 8. To this lub the tray 7 is pivotally connected by a pivot pin 22 which passes through holes in angle brackets 23 on the back of the tray and in the lug 21. A helical tension spring 24 is anchored at one end to the lug 21 by a split pin 25. The other end of the spring 24 is attached to a spring fixing bracket 26 secured to the tray 7 near its edge 27 which is towards the handle end of the shaft 6. The spring 24 urges the tray to a tilted position in which the edge 27 rests against the section 8. The spring 24 is strong enough to counterpoise the weight of the indicia to be affixed.

The tray 7 is flat, rectangular in shape and provided with a peripheral flange 28 continuous except for a gap 33 in each side. The size and shape of the tray is made to suit the size of the indicia slab or slabs 32 with which it is to be used. The tray may be changed for one of a different size by removing the pivot pin 22 and spring 24, fitting the different size tray, replacing the pivot pin 22 and re-attaching the spring 24. If indicia of various sizes are to be applied frequently there may be a separate tray for each size, each being mounted on its own lower section 8. The remaining sections 9 and 10 of the shaft may be disconnected at the joint with one lower section 8 and transferred to another lower section 8.

The intermediate section 9 is bent near the joint with the handle section 10 so that the handle section 10 is oblique to the remainder of the shaft. Hand grips 29 are provided, well spaced apart, at the ends of the section 10.

FIG. 1 shows the applicator in the position of use. The indicia slab 32 to be affixed is laid on the tray 7 adhesive side outwards. The slab 32 is prevented from slipping off the tray by resting on the portion 30 of the flange 28 on the edge of the tray opposite the edge 27. The flange portion 30 forms a retaining lip. In the position of the tray relative to the angled handle end of the shaft illustrated in FIG. 1 the applicator is convenient for affixing indicia on a mould surface 31 facing towards the surface 31 and the bottom edge of the slab 32 resting on the flange portion 30 is the first part to make contact with the surface. As the operator presses the tray towards the surface it swings about the line of contact of the bottom edge of the slab 32 with the surface 31 and pivots, in relation to the shaft 6, around the pivot pin 22 and against the action of the spring 24 until it reaches the position shown in broken lines in FIG. 2 in which the slab 32 is in full contact with the surface 31.

For use on a mould surface facing away from the operator the tray can be turned through 180° about the axis of the section 8 by compressing the spring 15 sufficiently to disengage the recesses 20 from the ends of the cross-pin 19, swivelling the tray 7 around the section 8 and allowing the recesses 20 and cross-pin 19 to re-engage in the new position. In the new position the open side of the tray is towards and below the operator, as shown in broken lines in FIG. 1.

We claim:

1. An applicator for holding a substantially flat object having a coating of adhesive on one face and applying the object to a substantially vertical surface, said applicator comprising a shaft having a handle at one end; a tray carried by the other end of said shaft, said tray having an open side facing away from said shaft and a lip along an edge of said open side away from said handle, said lip retaining said object on said tray; a pivotal joint mounting said tray on said shaft for angular movement about an axis transverse to said shaft and remote from said lip, said tray having a tilted position at one extreme of its angular movement and being so mounted with respect to said shaft that in said tilted position said open side faces partly towards said handle and said lip is prominent; the applicator further comprising spring means urging said tray towards said tilted position, the tray under pressure on said open side near said lip being angularly movable about said axis away from said tilted position against the action of said spring means.

2. An applicator according to claim 1 wherein the pivotal axis is so arranged to one side of said shaft that in the tilted position said spring means urges the edge of said tray that is nearer said handle end of said shaft against said shaft.

3. An applicator according to claim 1 wherein said shaft near said handle end is bent so that said handle end lies oblique to the remainder of said shaft.

4. An applicator according to claim 1 wherein said tray is flat, rectangular in shape and provided with a flange to form said retaining lip and extending around most of the periphery of said tray.

5. An applicator according to claim 1 wherein said shaft is built up from separable sections joined end-to-end.

6. An applicator according to claim 5 wherein said shaft has three separable sections comprising a lower section on which said tray is mounted, an intermediate section and a handle section, said intermediate section being bent so that said handle section is oblique to said lower section.

7. An applicator for holding an object having a coating of adhesive and applying the object to a substantially vertical surface, said applicator comprising a shaft forming a handle at one end, a tray having an open side, said tray being carried by the other end of said shaft and pivoted to said shaft about an axis transverse to said shaft, the open side of said tray facing away from said shaft and having at least along the edge remote from the handle end of said shaft a lip for retaining said object on said tray, a spring urging said tray towards one extreme of its pivotal movement into a tilted position in which said open side of said tray faces partly towards said handle end of said shaft, said tray and its pivot being swivelly mounted around said shaft and means being provided for locating said tray in pre-determined angular positions around said shaft.

8. An applicator according to claim 7 comprising a sleeve swivelly mounted around the shaft, a lug extending from said sleeve, said tray being pivoted to said lug, said sleeve and said shaft having axially engageable, cooperating, locating formations, and said sleeve being spring biassed axially to urge the formations into engagement.

9. An applicator according to claim 7 wherein said shaft has a main portion adjacent said tray, said shaft between said handle end and said main portion being bent so that said handle end lies oblique to the main portion and wherein said locating means has two pre-determined positions, in one position said tray facing away from the direction in which said handle is bent and in the other position facing towards that direction.

10. A method of applying an object having a coating of adhesive to a substantially vertical surface by the use of an applicator comprising a shaft forming a handle at one end, a tray having an open side, said tray being carried by the other end of said shaft and pivoted to said shaft about an axis transverse to said shaft, the open side of said tray facing away from said shaft and having at least along the edge remote from the handle end of said shaft a lip, a spring urging said tray towards one extreme of its pivotal movement into a tilted position in which said open side of said tray faces partly towards said handle end of said shaft, the method comprising the steps of laying the object on the tray, adhesive side outwards and so that the edge of the object rests on the retaining lip and the uncoated side of the object rests against the tray, holding the applicator in an attitude such that the retaining lip is lowermost and the tray is inclined rearwards and upwards, taking the applicator to the surface in this attitude, bringing the retaining lip towards the surface so that the edge of the object against the retaining lip is the first to engage the surface and urging the tray towards the surface against the spring action so causing the tray to tilt and bring the adhesive coated side of the object into full contact with the surface.

* * * * *